(12) United States Patent
Oki et al.

(10) Patent No.: US 7,403,791 B2
(45) Date of Patent: Jul. 22, 2008

(54) MOBILE COMMUNICATION TERMINAL AND METHOD OF CONTROLLING TRANSMISSION POWER

(75) Inventors: Noboru Oki, Saitama (JP); Katsutoshi Itoh, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 831 days.

(21) Appl. No.: 10/969,977

(22) Filed: Oct. 22, 2004

(65) Prior Publication Data

US 2005/0111391 A1 May 26, 2005

(30) Foreign Application Priority Data

Nov. 11, 2003 (JP) ............................ P2003-380942
Apr. 14, 2004 (JP) ............................ P2004-119013

(51) Int. Cl.
 *H04B 7/00* (2006.01)
(52) U.S. Cl. ................... 455/522; 455/452.1; 455/452.2
(58) Field of Classification Search .................. 455/522
 See application file for complete search history.

(56) References Cited

U.S. PATENT DOCUMENTS

| 6,064,659 | A  | * | 5/2000 | Rohani et al. | ................. | 370/318 |
| 6,335,922 | B1 | * | 1/2002 | Tiedemann et al. | .......... | 370/335 |
| 6,865,393 | B1 | * | 3/2005 | Baum et al. | ............... | 455/452.2 |
| 6,909,704 | B2 | * | 6/2005 | Sakoda | ........................ | 370/335 |
| 2001/0027112 | A1 | | 10/2001 | Voyer | | |
| 2001/0046213 | A1 | * | 11/2001 | Sakoda | ........................ | 370/328 |
| 2003/0013451 | A1 | | 1/2003 | Walton | | |
| 2003/0125040 | A1 | * | 7/2003 | Walton et al. | ................ | 455/454 |
| 2005/0272458 | A1 | * | 12/2005 | Sakoda | ........................ | 455/522 |

FOREIGN PATENT DOCUMENTS

EP          1 225 710 A2    7/2002

* cited by examiner

*Primary Examiner*—Matthew Anderson
*Assistant Examiner*—Perez M Angelica
(74) *Attorney, Agent, or Firm*—Oblon, Spivak, McClelland, Maier & Neustadt, P.C.

(57) ABSTRACT

The mobile communication terminal of the present invention comprises an amplitude regulator 3 regulating the amplitudes of signals of the DPDCH, DPCCH, and HS-DPCCH, a transmission-power controller 17 controlling the power-distribution ratio for the adjustment of transmission power of the individual transmission channels, and a priority-channel selector 18 choosing a priority channel from among the individual transmission channels. If the total transmission power of the individual transmission channels is going to exceed the maximum transmission power, the transmission-power controller 17 determines the power-distribution ratio among the individual transmission channels by adjusting the transmission power of the priority transmission channel to a power level demanded by a base station on the one hand and adjusting the transmission power of the non-priority channel so as to confine the total transmission power to the maximum transmission power on the other hand. Accordingly, the base station can receive information correctly even if the transmission power demanded by the base station is beyond the maximum transmission power of the mobile communication terminal.

12 Claims, 8 Drawing Sheets

F I G. 1
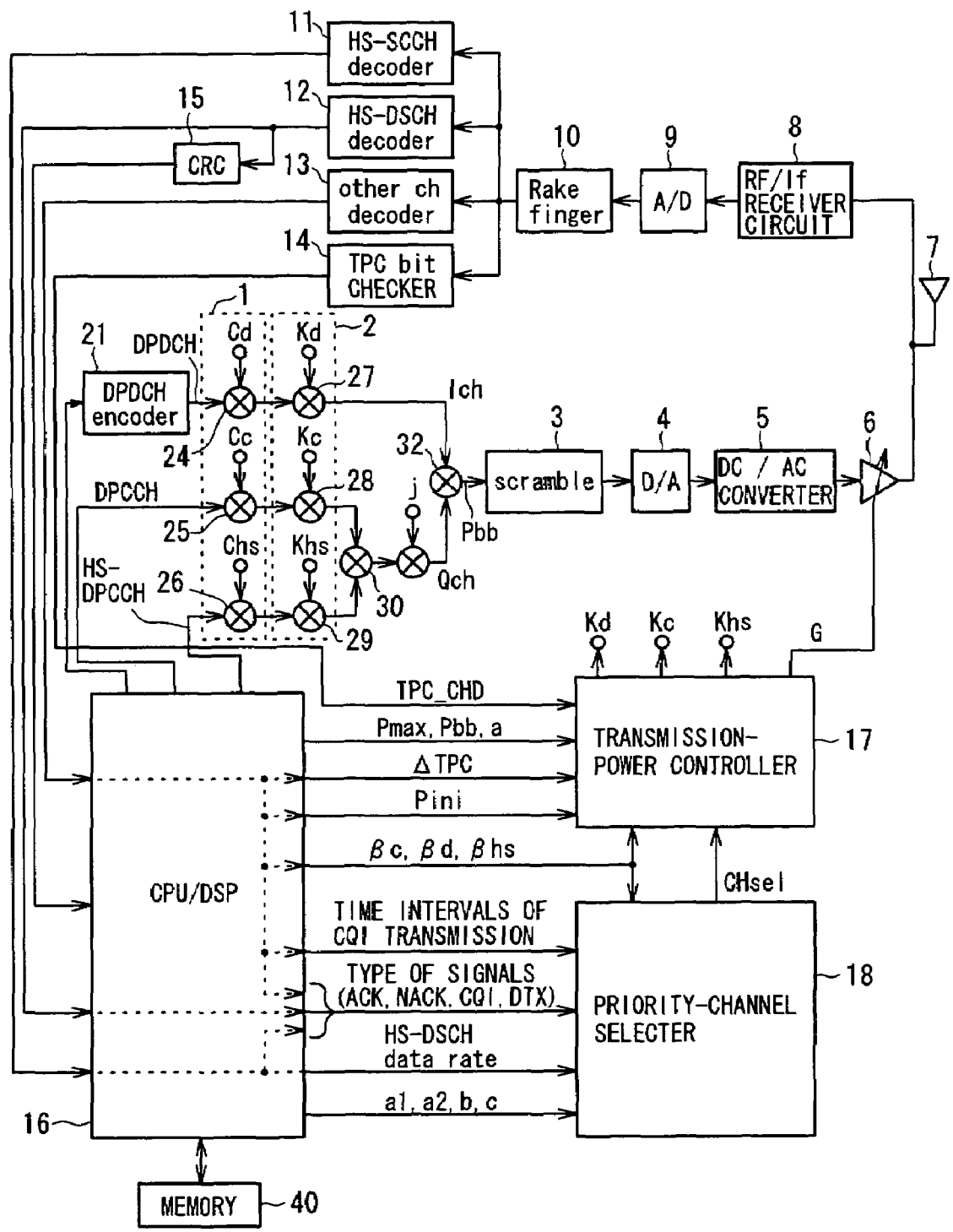

F I G. 4
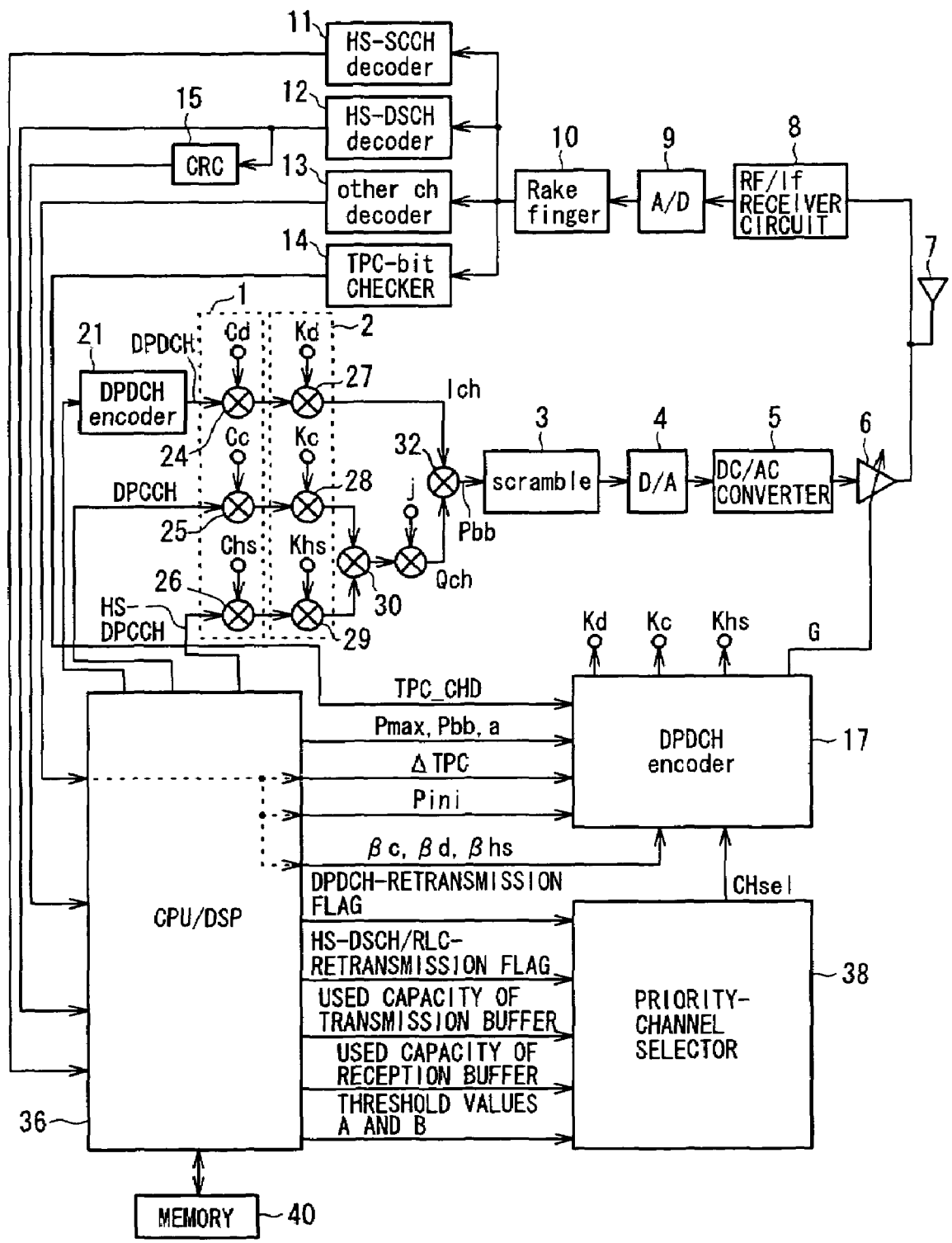

MOBILE COMMUNICATION TERMINAL AND METHOD OF CONTROLLING TRANSMISSION POWER

BACKGROUND OF THE INVENTION

1. Field of the Invention

This invention relates to a mobile communication terminal and a method of controlling transmission power for a multiplex radio communication system to send different pieces of information through two or more channels simultaneously.

2. Description of Related Art

Proposed recently in the field of mobile communication are multiplex radio communication systems to send different pieces of information through two or more channels simultaneously.

One of such systems is W-CDMA (Wideband Code Division Multiple Access) system of 3GPP (Third Generation Partnership Project).

3GPP defined additionally an HSDPA (High Speed Downlink Packet Access) system to raise the transmission rate of downlink data from a base station to mobile communication terminals. HSDPA and information about quality of received signals monitored by mobile communication terminals have made possible adaptive modulation and adaptive encoding. Besides, by frequently sending ACK (acknowledge) and NACK (unacknowledge) to the base station, retransmission and composition in high-speed physical layers are possible. ACK means normal reception of signals; NACK, abnormal reception of signals. As a result, the service of high-speed downlink data transmission has been materialized.

[Example of Construction of Conventional Mobile Communication Terminal]

FIG. 6 shows an example of construction of a conventional mobile communication terminal of the W-CDMA system. In FIG. 6, only the main components are shown, the other ones such as filters omitted.

First of all, the flow of outgoing signals is described.

In FIG. 6, the DPDCH (Dedicated Physical Data Channel) is a channel to send out signals. The data of the DPDCH are produced by undergoing retransmission/correction processing in an RLC (Radio Link Control), which is one of the function blocks of a CPU/DSP (Central Processing Unit/Digital Signal Processor) 116, and being channel-coded by a DPDCH encoder 121. Retransmission/correction means sending them to it again if data received by a mobile communication terminal are erroneous. The retransmission/correction of data of the DPDCH is realized in the RLC. The retransmission/correction requires a buffer to store transmitted data. In FIG. 6, a memory 140 connected to the CPU/DSP 116 is the buffer. Because retransmission takes time, retransmission or correction of data, such as voice data, requiring a short delay time does not take place. The DPCCH (Dedicated Physical Control Channel) is a channel to send out information to the receivers of the information for the correction of phases and the estimation of the quality of received signals. The HS-DPCCH (High-Speed Dedicated Physical Control Channel) is a channel to send the following information for HSDPA to the base station. The signals of the DPDCH, DPCCH, and HS-DPCCH are sent to a diffusion unit 101.

The signals of the HS-DPCCH have frame structure shown in FIG. 7. The length of one frame "Tf" is 10 ms. Each frame includes a plurality of subframes. The length of each subframe is 2 ms. Each subframe includes an HARQ (Hybrid Automatic Repeat Request)-ACK section and a CQI (Channel Quality Indicator) section. Indicated in the HARQ-ACK section is ACK or NACK. The base station sends out the next data in the case of ACK and re-sends out the same downlink data in the case of NACK. Indicated in the CQI section is information about quality of received signals. The base station determines the modulation factor and the encoding rate of downlink data based on the CQI and other information. The size of the HARQ-ACK section is 2,560 chips. Only when the mobile communication terminal receives signals addressed to it, ACK or NACK is sent out by the HARQ-ACK section. The size of the CQI section is 5,120 chips. Only when the network side designates time intervals, CQI's are sent out at the time intervals.

The signals of the DPDCH inputted into the diffusion unit 101 are sent to a multiplier 124. The signals of the DPCCH inputted into the diffusion unit 101 are sent to a multiplier 125. The signals of the HS-DPCCH inputted into the diffusion unit 101 are sent to a multiplier 126. The multiplier 124 multiplies the signals of the DPDCH by a channelization code $C_d$. The multiplier 125 multiplies the signals of the DPCCH by a channelization code $C_c$. The multiplier 126 multiplies the signals of the HS-DPCCH by a channelization code $C_{hs}$. Thus, the signals of the DPDCH, DPCCH, and HS-DPCCH are diffused by the channelization codes $C_d$, $C_c$, and $C_{hs}$, respectively, in the diffusion unit 101. Thereafter, the signals of the DPDCH, DPCCH, and HS-DPCCH are sent to an amplitude regulator 102.

In the amplitude regulator 102, the signals of the DPDCH, DPCCH, and HS-DPCCH are sent to multipliers 127, 128, and 129, respectively. The multiplier 127 multiplies the signals of the DPDCH by an amplitude ratio-setting coefficient $K_d$ coming from a transmission-power controller 117 to be described later. The multiplier 128 multiplies the signals of the DPCCH by an amplitude ratio-setting coefficient $K_c$ coming from the transmission-power controller 117. The multiplier 129 multiplies the signals of the HS-DPCCH by an amplitude ratio-setting coefficient $Kh_{hs}$ coming from the transmission-power controller 117. Thus, the amplitude regulator 102 regulates the amplitudes of signals of the DPDCH, DPCCH, and HS-DPCCH with the amplitude ratio-setting coefficients $K_d$, $K_c$, and $K_{hs}$, respectively. Thereafter, the signals of the DPDCH are sent, as signals of the I-phase, to an adder 132.

The HS-DPCCH is allocated to the I-or Q-phase depending on the multi-code number of the DPDCH. For example, if the DPDCH is one channel, the HS-DPCCH is allocated to the Q-channel and multi-coded with the DPCCH. In FIG. 6, the signals of the DPCCH and the HS-DPCCH after the setting of the amplitude ratio are added up by an adder 130 and sent, as signals of the Q-phase, to the adder 132.

In the adder 132, the signals of the I-phase and those of the Q-phase are multiplexed. In the example of construction shown in FIG. 6, the transmission-power controller 117 regulates the amplitude ratio-setting coefficients $K_d$, $K_c$, and $K_{hs}$ so as to make the power of the multiplexed signals (the power of the base band) a constant value $P_{bb}$.

A scrambler 103 scrambles the multiplexed signals with a prescribed scrambling code, and the scrambled multiplexed signals are sent to a D/A (Digital/Analog) converter 104. The D/A converter 104 converts the digital signals to analog signals and sends the analog signals to a DC/AC converter 105. The DC/AC converter 105 converts the DC signals to AC signals. It is assumed for the simplicity of description that the gains of the scrambler 103, D/A converter 104, and DC/AC converter 105 are 0 dB. The AC signals are sent to a variable-gain amplifier 106.

The variable-gain amplifier 106, under the control by the transmission-power controller 117, amplifies the power of the AC signals (the power of signals of the RF band) with a gain G up to the level of necessary transmission power and sends the amplified signals to an antenna 107.

The antenna 107 transmits the signals.

Next, the flow of received signals will briefly be described.

The antenna 107 receives signals. The signals are amplified and down-converted by an RF/IF (Radio Frequency/Intermediate frequency) receiver circuit 108, converted to digital signals by an A/D (Analog/Digital) converter 109, and back-diffused and rake-composed by a rake-finger unit 110. Thereafter, the signals of the channels are sent to decoders 111, 112, and 113 which are provided to correspond to the channels.

An HS-SCCH (High-Speed Signaling Control Channel) decoder 111 decodes the signals of an HS-SCCH, which is a control-signal channel for HSDPA service, and sends the decoded signal to the CPU/DSP 116.

An HS-DSCH (High-Speed Downlink Shared Channel) decoder 112 decodes the signals of an HS-DSCH which is a data channel for HSDPA service. The decoded signals and the result of the checkup of data for errors by a CRC (Cyclic Redundancy Check) unit 115 are sent to the CPU/DSP 116. The HS-DSCH decoder 112 has a buffer for retransmission and composition. By using data stored in the buffer, the above retransmission and composition in physical layers are accomplished.

An other-channel decoder 113 decodes the signals of another channel and sends the decoded signals to the CPU/DSP 116. For example, it decodes the signals of a control channel transmitted in advance of HSDPA service.

A TPC (Transmission Power Control)-bit checker 114 extracts and reads the TPC bits, which are inserted in the channels from the rake-finger unit 110, and sends the results of the reading to the transmission-power controller 117.

If the decoded data can be retransmitted and corrected in the RLC of the CPU/DSP 116, the retransmission/correction processing is made in the RLC. Such retransmission/correction processing requires a buffer; accordingly, the memory 140 connected to the CPU/DSP 116 serves as the buffer, too. If the data of the HS-DSCH can be retransmitted and corrected in the RLC, the retransmission and correction are made in the RLC, in addition to the retransmission and composition in physical layers.

The CPU/DSP 116 holds the values of maximum transmission power $P_{max}$ and base-band power $P_{bb}$, parameters peculiar to the mobile communication terminal, in an internal memory or the like. Besides, the CPU/DSP 116 collects, from the data of the control channel transmitted in advance of HSDPA service, information about (i) $\Delta_{TPC}$ showing how many bits are controlled per one time of transmission-power control, (ii) initial transmission power $P_{ini}$, (iii) a weighting coefficient $\beta_d$ corresponding to the transmission-power ratio of the DPDCH to the other channels, (iv) a weighting coefficient $\beta_c$ corresponding to the transmission-power ratio of the DPCCH to the other channels, (v) a weighting coefficient $\beta_{hs}$ corresponding to the transmission-power ratio of the HS-DPCCH to the other channels.

The transmission-power controller 117 calculates the amplitude ratio-setting coefficients $K_d$, $K_c$, $K_{hs}$, and G from $P_{max}$, $P_{bb}$, $\Delta_{TPC}$, $P_{ini}$, $\beta_d$, $\beta_c$, $\beta_{hs}$, and a TPC_CMD (command) and controls the transmission power ratios and the total transmission power of the channels.

The $\Delta_{TPC}$ and the TPC_CMD are parameters relating to closed-loop power control. The closed-loop power control means the control of the transmission power of the communication device on the other end to make the quality of received signals constant. In the closed-loop power control of the transmission power of a mobile communication terminal, the base station calculates the quality of reception from the signals of the DPCCH. If the quality of reception is below the target quality, the base station inserts a command to raise the transmission power as TPC bits into the signals to be sent to the mobile communication terminal. If the quality of reception is beyond the target quality, the base station inserts a command to lower the transmission power as TPC bits into the signals to be sent to the mobile communication terminal. The mobile communication terminal receives the TPC bits and interprets them as a TPC_CMD. The TPC_CMD of "+1" means raising the transmission power, and the TPC_CMD of "−1" means lowering the transmission power. The $\Delta_{TPC}$ is the parameter to determine how many bits are controlled per one time of control of transmission power.

[Flowchart of Conventional Control of Transmission Power]

FIG. 8 is a flowchart of the control of transmission power by the transmission-power controller 117. In step S101, $\Delta_{TPC}$, $P_{bb}$, $P_{max}$, and $P_{ini}$ are inputted into the transmission-power controller 117. $\Delta_{TPC}$ and $P_{ini}$ are given to the mobile communication terminal by the base station and stored in the internal memory of the CPU/DSP 116 in advance of communication, and then they are inputted into the transmission-power controller 117. Each mobile communication terminal has $P_{bb}$ of a fixed value. $P_{max}$ is determined by the specification of each mobile communication terminal. $P_{bb}$ and $P_{max}$ are given to the transmission-power controller 117 by the CPU/DSP 116.

In step S102, TPC_CMDs, $\beta_d$, $\beta_c$, and $\beta_{hs}$ are inputted into the transmission-power controller 117. The CPU/DSP 116 gives the controller 117 a TPC_CMD for each slot and $\beta_d$, $\beta_c$, and $\beta_{hs}$ as the need arises. After step S102, the transmission-power controller 117 proceeds to step S103.

In step S103, the transmission-power controller 117 finds the values of $K_d$, $K_c$, and $K_{hs}$ by using the arithmetic expressions shown at step S103 so as to make $P_{bb}$ constant regardless of any values of $\beta_d$, $\beta_c$, and $\beta_{hs}$.

In step S104, the transmission-power controller 117 checks to see whether the transmission in process is the initial transmission or not. If it is the initial transmission, the transmission-power controller 117 proceeds to step S105. If it is not, the transmission-power controller 117 proceeds to step S106.

In step S105, the transmission-power controller 117 subtracts $P_{bb}$ from $P_{ini}$ to find G and proceeds to step S107.

On the other hand, in step S106, the transmission-power controller 117 calculates the gain G to be given to the variable-gain amplifier 106 from the transmission power at the time of previous power control $G_{prev}$, the present amplitude ratio-setting coefficient $K_c$, the amplitude ratio-setting coefficient used for gain-setting at the time of previous power control $K_{c\_rev}$, and the above TPC_CMD and $\Delta_{TPC}$. The first term of the arithmetic expression shown at step S106 is the set value of the gain at the time of previous power control. The second term of the arithmetic expression is to offset the gain due to the change of $K_c$ occurring as the $\beta$'s change. The third term of the arithmetic expression is to up and down the gain according to the results of reception-of TPC_CMD's. After the processing of step S106, the transmission-power controller 117 proceeds to step S107.

In step S107, the transmission-power controller 117 stores the value of $K_c$ found in step S103 as an amplitude ratio-setting coefficient $K_{c\_prev}$ to be used for gain-setting at the time of next power control.

In step S108, the transmission-power controller 117 checks to see whether $P_{bb}+G$ is larger than $P_{max}$ or not. If it is, the transmission-power controller 117 proceeds to step S109. If it is not, the transmission-power controller 117 proceeds to step S110.

In step S109, the transmission-power controller 117 subtracts $P_{bb}$ from $P_{max}$ to find G and proceeds to step S110. Thus, in steps S108 and S109, the transmission-power controller 117 regulates the gain G so that the transmission power does not exceed the maximum transmission power $P_{max}$.

In step S110, the transmission-power controller 117 stores the gain G found in step S105, S106, or S109, as the case may be, as a gain $G_{prev}$ to be used for the next power control and returns to step S102.

Disclosed in the Japanese Unexamined Patent Publication No. 2001-308723 (patent literature 1) is a communication device, which comprises (i) means of multiplying channels by coefficients according to kinds of communication service, kinds of data to be transmitted, or transmission speeds, (ii) a means of multiplexing and modulating the signals of the channels, (iii) a means of varying the transmission power of the multiplexed and modulated signals (hereinafter "gain-varying means"), (iv) a mean of controlling the gain-varying means, and (v) a means of controlling the gain-controlling means so that the maximum transmission power at the time of transmission is controlled by using transmission power which is different from the maximum transmission power which can be set according to the combination of transmission speeds or channels if signals are not transmitted through all the channels simultaneously. With the above construction, the communication device is capable of quality communication in spite of the control of maximum transmission power.

[Patent Literature 1] Japanese Unexamined Patent Publication No. 2001-308723 (FIG. 1)

As described above with reference to FIGS. 6-8, if the transmission power demanded by the base station is beyond the maximum transmission power of the mobile communication terminal, the gain of the variable-gain amplifier 106 is lowered and, as a result, the power levels of the multiplexed channels are evenly reduced below the power level demanded by the base station.

Accordingly, the characteristics of reception of all the channels at the base station deteriorate and, in the worst case, the base station cannot correctly receive information through all the channels. This problem is serious if data cannot be retransmitted or corrected.

OBJECT AND SUMMARY OF THE INVENTION

The present invention was made in view of the above problem. The object of the present invention is to provide a mobile communication terminal and a method of controlling transmission power so that a base station can receive information correctly even if the transmission power demanded by the base station is beyond the maximum transmission power of the mobile communication terminal.

One aspect of the present invention resides in a mobile communication terminal comprises (i) a signal-sending/receiving unit capable of sending and receiving multiplexed signals through a plurality of channels, (ii) a transmission-power adjuster to adjust the transmission power of the individual channels, (iii) a transmission-power controller to control the power-distribution ratio among the channels for the adjustment of transmission power of the individual channels by the transmission-power adjuster, (iv) an information holder holding the maximum transmission power of the mobile communication terminal, and (v) a priority-setting unit to set the order of priority of the channels by using prescribed materials for determining the order of priority. The transmission-power controller compares the transmission power demanded by the communication device at the other end and the maximum transmission power of the mobile communication terminal and controls the transmission power of individual channels according to the transmission power demanded by the communication device at the other end. If the total transmission power is going to exceed the maximum transmission power, the transmission-power controller determines the power-distribution ratio among the channels so that the transmission power of the priority channel is adjusted to the power level demanded by the communication device at the other end on the one hand and the transmission power of the non-priority channel or channels is adjusted so as to confine the total transmission power to the maximum transmission power on the other hand.

In the aspect, included in the plurality of channels are at least a data-transmitting channel, a control information-transmitting channel for transmission of control information corresponding to the data-transmitting channel, and a channel for transmitting high-speed control information corresponding to a high-speed data-transmitting channel, all prescribed in a prescribed communication standard, and the order of priority of the data-transmitting channel and the high-speed-control-information-transmitting channel in particular is determined.

In the aspect, while the data-transmitting channel and the high-speed-control-information-transmitting channel are being used, the priority-setting unit gives priority to (i) the data-transmitting channel if retransmission is demanded by retransmission-control information of the high-speed-control-information-transmitting channel, (ii) the high-speed-control-information-transmitting channel if retransmission is not demanded, and (iii) the high-speed-control-information-transmitting channel if information on the quality of received signals is transmitted.

In the aspect, while the data-transmitting channel and the high-speed-control-information-transmitting channel are being used, the priority-setting unit gives priority to the high-speed-control-information-transmitting channel if retransmission is not demanded by retransmission-control information of the high-speed-control-information-transmitting channel and the data-transmission rate of the high-speed data-transmitting channel is higher than a prescribed threshold value.

In the aspect, while the data-transmitting channel and the high-speed-control-information-transmitting channel are being used, the priority-setting unit gives priority to the high-speed-control-information-transmitting channel if information on the quality of received signals is transmitted through the high-speed-control-information-transmitting channel to the communication device at the other end and the time intervals of transmission of the information is longer than a prescribed threshold value.

In the aspect, the priority-setting unit uses the power-distribution ratio among channels as a material for setting the order of priority of channels and gives priority to (i) the data-transmitting channel if power-distribution ratio of the data-transmitting channel to the high-speed-control-information-transmitting channel is equal to or smaller than a prescribed threshold value and (ii) the high-speed-control-information-transmitting channel if the ratio is larger than the threshold value.

In the aspect, the priority-setting unit (i) uses, as materials for setting the order of priority of channels, information about whether data to be transmitted through the data-transmitting channel can be retransmitted or not and whether a buffer for storage of the data to be retransmitted has sufficient unused capacity or not if the data can be retransmitted and (ii) gives priority to the data-transmitting channel if the data cannot be retransmitted or the buffer does not have sufficient unused capacity.

In the aspect, the priority-setting unit (i) uses, as materials for setting the order of priority of channels, information about whether data to be transmitted through the high-speed data-transmitting channel can be retransmitted or not and whether the buffer for storage of the data to be retransmitted has sufficient unused capacity or not if the data can be retransmitted and (ii) gives priority to the high-speed-control-information-transmitting channel if the data cannot be retransmitted or the buffer does not have sufficient unused capacity.

In the aspect, the priority-setting unit (1) uses, as materials for setting the order of priority of channels, information about (i) whether data to be transmitted through the data-transmitting channel can be retransmitted or not, (ii) whether the buffer for storage of the data to be retransmitted through the data-transmitting channel has sufficient unused capacity or not if the data can be retransmitted through the data-transmitting channel, (iii) whether data to be transmitted through the high-speed data-transmitting channel can be retransmitted or not if the data to be transmitted through the data-transmitting channel can be retransmitted and the buffer has sufficient unused capacity for storage of the data to be retransmitted through the data-transmitting channel, (iv) whether the buffer for storage of the data to be retransmitted through the high-speed data-transmitting channel has sufficient unused capacity or not if the data can be retransmitted through high-speed data-transmitting channel and (2) gives priority to (i) the data-transmitting channel if the data cannot be retransmitted through the data-transmitting channel or the buffer does not have sufficient unused capacity for the storage of the data to be retransmitted through the data-transmitting channel and (ii) the high-speed-control-information-transmitting channel if the data can be retransmitted through the data-transmitting channel, the buffer has sufficient unused capacity for the storage of the data to be retransmitted through the data-transmitting channel, and the data cannot be retransmitted through the high-speed data-transmitting channel or the buffer does not have sufficient unused capacity for the storage of the data to be retransmitted through the high-speed data-transmitting channel.

Another aspect of the present invention resides in a method of controlling transmission power according to the present invention comprises the steps of (i) sending and receiving multiplexed signals through a plurality of channels, (ii) adjusting the transmission power of the individual channels, (iii) controlling the power-distribution ratio among the channels for the adjustment of transmission power of the individual channels, and (iv) setting the order of priority of the channels by using prescribed materials for determining the order of priority. In the step of controlling the power-distribution ratio among the channels, the transmission power demanded by the communication device at the other end and the maximum transmission power of the mobile communication terminal are compared and the transmission power of individual channels is controlled according to the transmission power demanded by the communication device at the other end. If the total transmission power is going to exceeds the maximum transmission power, the power-distribution ratio among the channels are so determined that the transmission power of the priority channel is adjusted to the power level demanded by the communication device at the other end on the one hand and the transmission power of the non-priority channel or channels is adjusted so as to confine the total transmission power to the maximum transmission power on the other hand.

Namely, if the total transmission power of the mobile communication terminal of the present invention is going to exceed its maximum transmission power, the order of priority of channels is determined and the power-distribution ratio among channels is changed according to the order of priority. The transmission power demanded by the communication device at the other end is secured for the priority channel, whereas the transmission power of the non-priority channel or channels is adjusted so as to confine the total transmission power to the maximum transmission power. Thus, information can be transmitted without deteriorating the characteristics on the reception side of the priority channel.

Besides, the order of priority of channels are determined based on whether the data of channels can be retransmitted and corrected or not and a channel whose data are more difficult to retransmit or a channel relating to the difficult channel is chosen as a priority one. Thus, the probability of success in data retransmission is high.

According to the present invention, if the total transmission power of the mobile communication terminal of the present invention is going to exceed its maximum transmission power, the transmission power demanded by the communication device at the other end is secured for the priority channel, whereas the transmission power of the non-priority channel or channels is adjusted so as to confine the total transmission power to the maximum transmission power. Accordingly, even if the transmission power demanded by the base station exceeds the maximum transmission power of the mobile communication terminal, the base station can receive information through the priority channel correctly.

Other and further objects, features and advantages of the invention will appear more fully from the following description.

BRIEF DESCRIPTION OF THE DRAWINGS

FIG. 1 is a block diagram showing an example of the construction of main components of the portable telephone terminal of the first embodiment of the present invention;

FIG. 4 is a block diagram showing an example of the construction of main components of the portable telephone terminal of the second embodiment of the present invention;

DESCRIPTION OF THE PREFERRED EMBODIMENTS

Preferred embodiments of the present invention will be described below by referring to drawings.

The embodiments will be described by taking a portable telephone terminal and its communication system, which HSDPA service of the W-CDMA system of 3GPP is applied to, as examples of the mobile communication terminal and the method of controlling the transmission power of the present invention.

Construction of Portable Telephone Terminal of First Embodiment

FIG. 1 shows an example of the construction of the portable telephone terminal of the first embodiment of the present invention. In FIG. 1, only the main components are shown, the other ones such as filters omitted.

First of all, the flow of outgoing signals will be described below.

Figure 6:
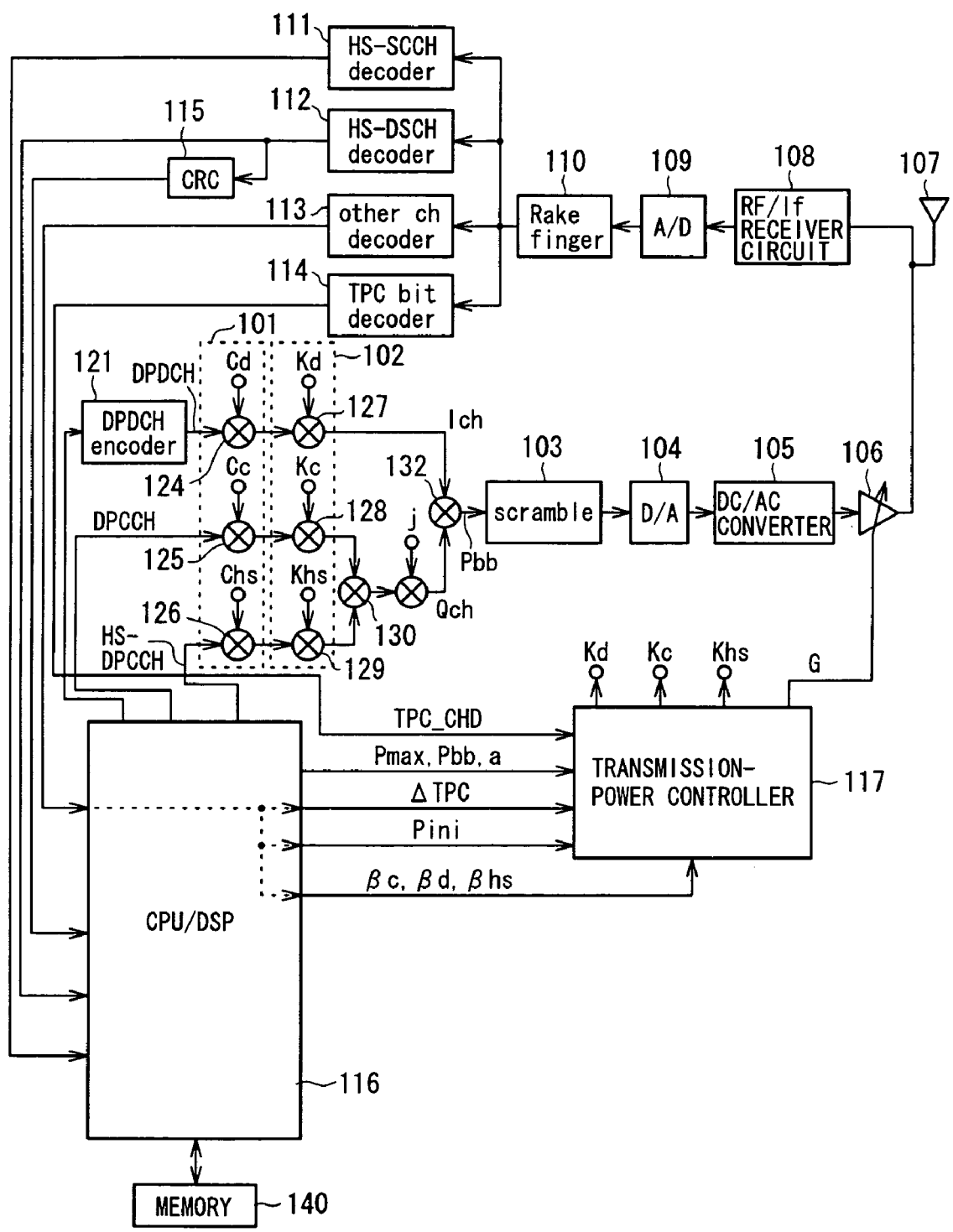
FIG. 6 is a block diagram showing an example of the construction of main components of a conventional mobile communication terminal.
Figure 7:
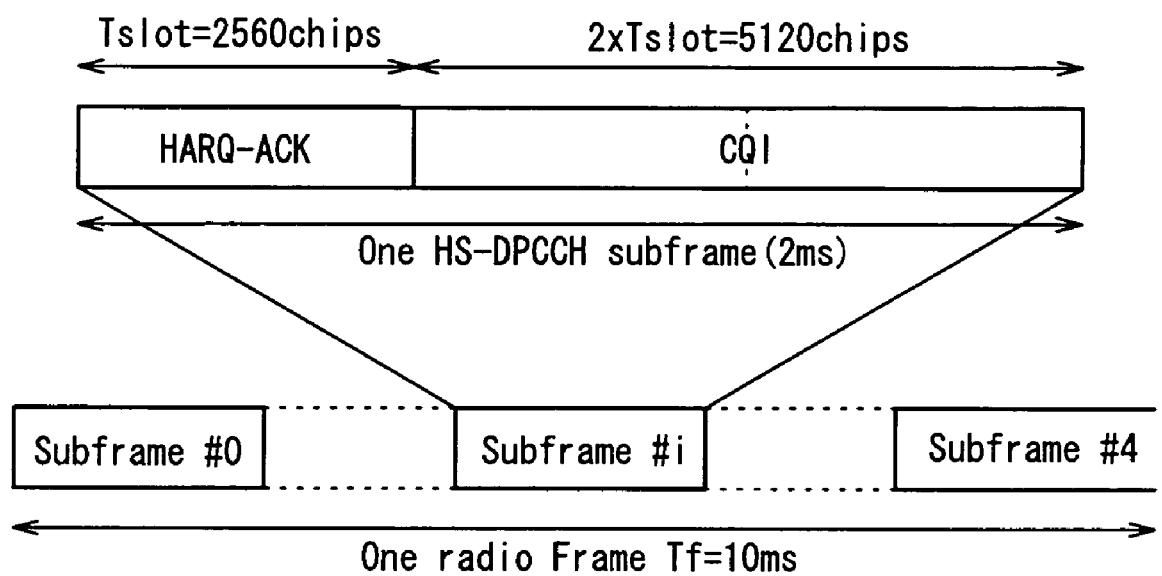
FIG. 7 shows a frame structure of HS-DPCCH.

The DPDCH, DPCCH, and HS-DPCCH shown in FIG. 1 are similar to those shown in FIG. 6. The data of the DPDCH are produced by undergoing retransmission/correction processing in an RLC, which is one of the function blocks of a CPU/DSP 16 (the RLC function can be realized by other devices than the CPU/DSP 16, too), and being channel-coded by a DPDCH encoder 21. The retransmission/correction requires a buffer to store transmitted data; accordingly, a memory 40 connected to the CPU/DSP 16 is provided as the buffer. Because retransmission takes time, retransmission or correction of data, such as voice data, requiring a short delay time does not take place. The signals of the DPDCH, DPCCH, and HS-DPCCH are sent to a diffusion unit 1. The signals of the HS-DPCCH have the frame structure of FIG. 7.

The signals of the DPDCH inputted into the diffusion unit 1 are sent to a multiplier 24. The signals of the DPCCH inputted into the diffusion unit 1 are sent to a multiplier 25. The signals of the HS-DPCCH inputted into the diffusion unit 1 are sent to a multiplier 26. The multiplier 24 multiplies the signals of the DPDCH by channelization code $C_d$. The multiplier 25 multiplies the signals of the DPCCH by a channelization code $C_c$. The multiplier 26 multiplies the signals of the HS-DPCCH by a channelization code $C_{hs}$. Thus, the signals of the DPDCH, DPCCH, and HS-DPCCH are diffused by the channelization codes $C_d$, $C_c$, and $C_{hs}$, respectively, in the diffusion unit 1. Thereafter, the signals of the DPDCH, DPCCH, and HS-DPCCH are sent to an amplitude regulator 2.

In the amplitude regulator 2, the signals of the DPDCH, DPCCH, and HS-DPCCH are sent to multipliers 27, 28, and 29, respectively. The multiplier 27 multiplies the signals of the DPDCH by an amplitude ratio-setting coefficient $K_d$ coming from a transmission-power controller 17 to be described later. The multiplier 28 multiplies the signals of the DPCCH by an amplitude ratio-setting coefficient $K_c$ coming from the transmission-power controller 17. The multiplier 29 multiplies the signals of the HS-DPCCH by an amplitude ratio-setting coefficient $K_{hs}$ coming from the transmission-power controller 17. Thus, the amplitude regulator 2 regulates the amplitudes of signals of the DPDCH, DPCCH, and HS-DPCCH with the amplitude ratio-setting coefficients $K_d$, $K_c$, and $Kh_{hs}$, respectively. In other words, the amplitude regulator 2 regulates the transmission-power ratio of the DPDCH, DPCCH, and HS-DPCCH with the amplitude ratio-setting coefficients $K_d$, $K_c$, and $K_{hs}$. Thereafter, the signals of the DPDCH are sent, as signals of the I-phase, to an adder 32.

As in the case of FIG. 6, the signals of the DPCCH and the HS-DPCCH after the adjustment of the amplitudes are added up by an adder 30 and sent, as signals of the Q-phase, to the adder 32.

In the adder 32, the signals of the I-phase and those of the Q-phase are multiplexed.

A scrambler 3 scrambles the multiplexed signals with a prescribed scrambling code, and the scrambled multiplexed signals are sent to a D/A (Digital/Analog) converter 4. The D/A converter 4 converts the digital signals to analog signals and sends the analog signals to a DC/AC converter 5. The DC/AC converter 5 converts the DC signals to AC signals. As in the case of the mobile communication terminal of FIG. 6, it is assumed for the simplicity of description that the gains of the scrambler 3, D/A converter 4, and DC/AC converter 5 are 0 dB. The AC signals are sent to a variable-gain amplifier 6.

The variable-gain amplifier 6, under the control by the transmission-power controller 17, amplifies the power of the AC signals with a gain G up to the level of necessary transmission power and sends the amplified signals to an antenna 7.

The antenna 7 transmits the signals.

Next, the flow of incoming signals will briefly be described below.

The antenna 7 receives signals. The signals are amplified and down-converted by an RF/IF (Radio Frequency/Intermediate frequency) receiver circuit 8, converted to digital signals by an A/D (Analog/Digital) converter 9, and back-diffused and rake-composed by a rake-finger unit 10. Thereafter, the signals of the channels are sent to decoders 11, 12, and 13 which are provided to correspond to the channels.

The HS-SCCH decoder 11 decodes the signals of the HS-SCCH, which is the control-signal channel for HSDPA service, and sends the decoded signal to the CPU/DSP 16.

The HS-DSCH decoder 12 decodes the signals of the HS-DSCH which is the data channel for HSDPA service. The decoded signals and the result of checkup of data for errors by a CRC unit 15 are sent to the CPU/DSP 16. The HS-DSCH decoder 12 has a buffer for retransmission and composition. By using data stored in the buffer, the above retransmission and composition in physical layers are accomplished.

The other-channel decoder 13 decodes the signals of another channel and sends the decoded signals to the CPU/DSP 16. For example, it decodes the signals of a control channel transmitted in advance of HSDPA service.

A TPC-bit checker 14 extracts and reads TPC bits, which are inserted in the channels from the rake-finger unit 10, and sends the results of the reading to the transmission-power controller 17.

If the decoded data can be retransmitted and corrected in the RLC of the CPU/DSP 16, the retransmission/correction processing is made in the RLC. Such retransmission/correction processing requires a buffer; accordingly, the memory 40 connected to the CPU/DSP 16 serves as the buffer, too. If the data of the HS-DSCH can be retransmitted and corrected in the RLC, the retransmission and correction is made in the RLC, too, in addition to the retransmission and composition in physical layers.

The CPU/DSP 16 holds the values of maximum transmission power $P_{max}$ and base-band power $P_{bb}$, parameters peculiar to the mobile communication terminal, in an internal memory. Besides, the CPU/DSP 16 collects, from the data of the control channel transmitted in advance of HSDPA service, information about (i) $\Delta_{TPC}$ showing how many bits are controlled per one time of transmission-power control, (ii) initial transmission power $P_{ini}$, (iii) the weighting coefficient $\beta_d$ corresponding to the transmission-power ratio of the DPDCH to the other channels, (iv) the weighting coefficient $\beta_c$ corresponding to the transmission-power ratio of the DPCCH to the other channels, (v) the weighting coefficient $\beta_{hs}$ corresponding to the transmission-power ratio of the HS-DPCCH to the other channels.

The transmission-power controller 17 calculates the amplitude ratio-setting coefficients $K_d$, $K_c$, and $K_{hs}$ and G from $P_{max}$, $P_{bb}$, $\Delta_{TPC}$, $\beta_{ini}$, $\beta_d$, $\beta_c$, $\beta_{hs}$, and a TPC_CMD (command) to control the power ratio and the total transmission power of the channels.

The above construction and workings are basically the same as those of the example of prior art of FIG. 6, but the portable telephone terminal of the first embodiment of the present invention has a priority-channel selector 18 to be described later, and the transmission-power controller 17 changes its workings according to the priority-channel information $CH_{sel}$ outputted by the priority-channel selector 18.

Besides, in the case of the portable telephone terminal of the first embodiment of the present invention, the CPU/DSP 16 gives the transmission-power controller 17 a parameter or parameters a or a's showing what extent or extents the β or β's for non-priority-channel or channels can be lowered.

The priority-channel selector 18 receives through the CPU/DSP 16 (i) the weighting coefficients $\beta_d$, $\beta_c$, $\beta_{hs}$, (ii) information about time intervals of CQI transmission, (iii) information showing which type of signals are to be transmitted with the next HS-DPCCH slot, ACK, NACK, CQI, or DTX (Discontinuous Transmission), (iv) information about the rate of data reception of HS-DSCH, and (v) threshold values $a_1$, $a_2$, b, and c to be determined in advance and selects a priority channel based on such data and information. The time intervals of CQI transmission are acquired from the data of the control channel to be sent from the base station in advance of HSDPA service. Which type of signals to transmit next is determined based on information in HS-SCCH data showing the addressees of data, the result of the checkup by the CRC unit 15 (ACK if no error, and NACK if an error or errors), and time intervals of CQI transmission. The data rate of the HS-DSCH is acquired from the relevant information in the data of the HS-SCCH.

Figure 2:
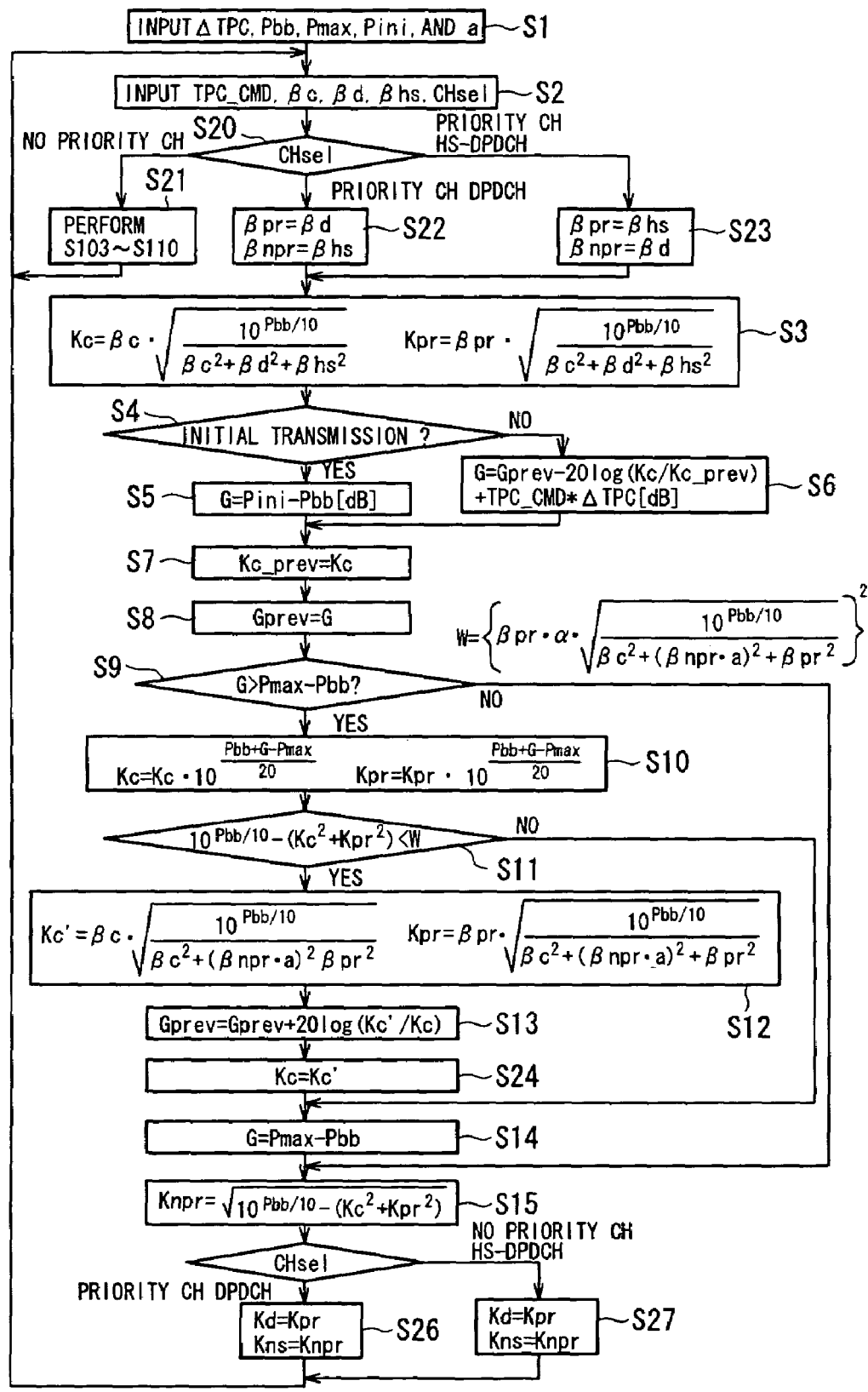
FIG. 2 is a flowchart showing processing by the transmission-power controller of each embodiment of the present invention.

How the priority-channel selector 18 selects a priority channel by using the above information and data will be described later. Now the processing by the transmission-power controller 17 is described by referring to FIG. 2.

Processing for Control of Transmission Power According to First Embodiment

As in the case of step S101 of FIG. 6, in step S1, the CPU/DSP 16 sends $\Delta_{TPC}$, $P_{bb}$, $P_{max}$, and $P_{ini}$ to the transmission-power controller 17. Besides, the CPU/DSP 16 gives the transmission-power controller 17 a parameter or parameters a or a's showing what extent or extents the weighting coefficient or coefficients β or β's for non-priority-channel or channels can be lowered.

As in the case of step S102 of FIG. 6, in step S2, the CPU/DSP 16 sends TPC_CMDs, $\beta_d$, $\beta_c$, and $\beta_{hs}$ to the transmission-power controller 17. Besides, the priority-channel selector 18 sends a piece of priority-channel information $Ch_{sel}$, a parameter indicating which channel is the priority one, to the transmission-power controller 17. In this embodiment, the DPCCH is always the priority one, because it is the channel where the quality of reception is measured in the closed-loop power control. If the DPCCH is regarded as a non-priority channel and its transmission power is lowered, the closed-loop power control does not work normally. Besides, the processing of reception (phase correction, etc.) of signals of the DPDCH and HS-DPCCH are made by making use of the DPCCH; accordingly, if the transmission power of the DPCCH is lowered, the reception characteristics of the DPDCH and HS-DPCCH drop. Therefore, the priority-channel information $Ch_{sel}$ outputted from the priority-channel selector 18 is a parameter to choose the DPDCH or HS-DPCCH as either a priority or non-priority channel. After step S2, the transmission-power controller 17 proceeds to step S20.

In step S20, the transmission-power controller 17 finds, from the priority-channel information $Ch_{sel}$, which is the priority channel, the DPDCH or the HS-DPCCH, or if neither the DPDCH nor the HS-DPCCH is designated as the priority one. If no channel is designated as the priority one, the transmission-power controller 17 proceeds to step S21. If the DPDCH is the priority one, the transmission-power controller 17 proceeds to step S22. If the HS-DPCCH is the priority one, the transmission-power controller 17 proceeds to step S23.

Figure 8:
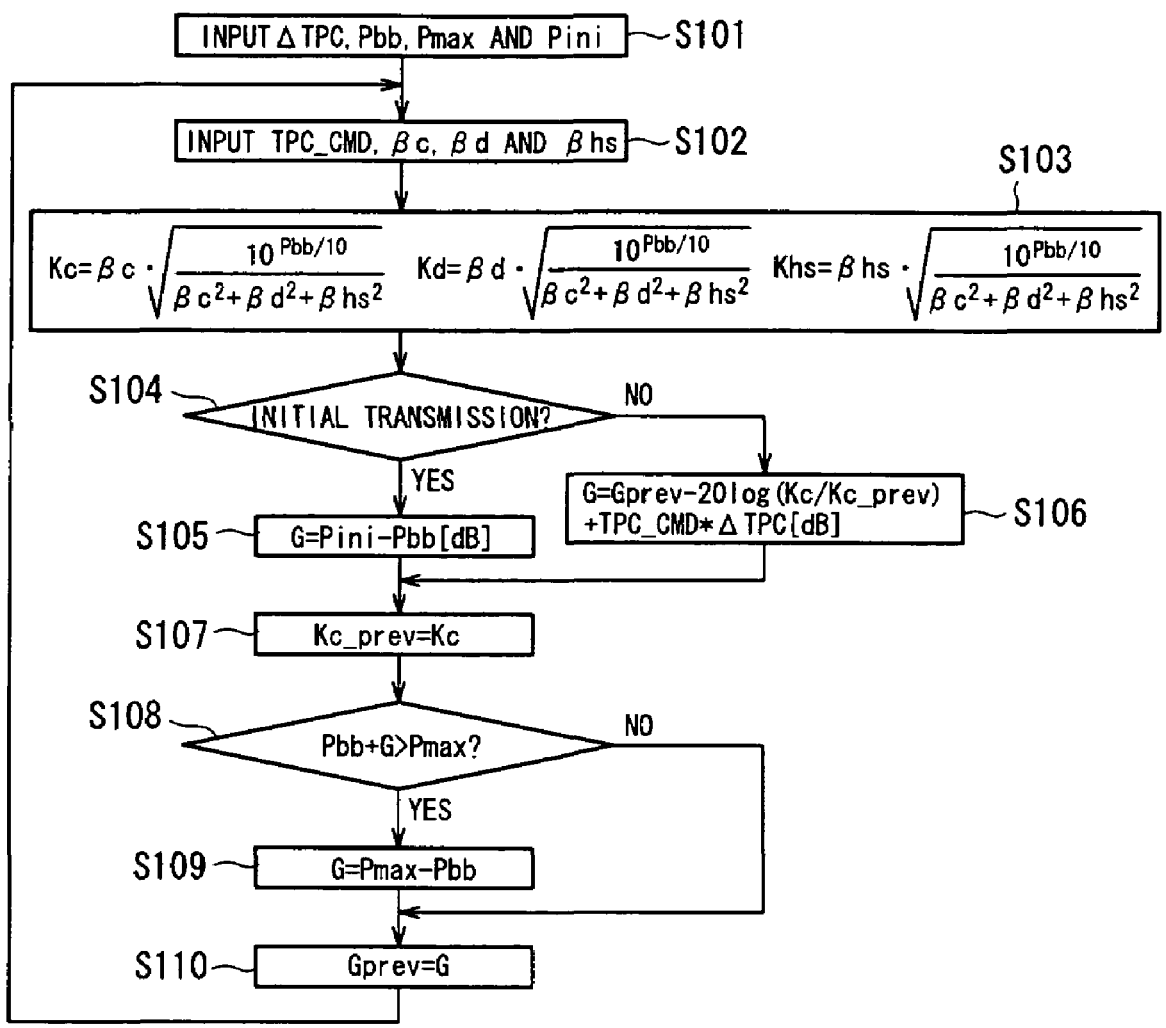
FIG. 8 is a flowchart of the control of transmission power by the transmission-power controller of the conventional mobile communication terminal.

The transmission-power controller 17 makes the same processing in step 21 as the transmission-power controller 117 of FIG. 6 makes in steps 103 to 110 of FIG. 8. Then, the transmission-power controller 17 returns to step S2.

If the transmission-power controller 17 has proceeded to step S22, it regards the weighting coefficient $\beta_d$ of the DPDCH as equal to the weighting coefficient $\beta_{pr}$ of the priority channel and the weighting coefficient $\beta_{hs}$ of the HS-DPCCH as equal to the weighting coefficient $\beta_{npr}$ of the non-priority channel and proceeds to step S3.

If the transmission-power controller 17 has proceeded to step S23, it regards the weighting coefficient $\beta_{hs}$ of the HS-DPCCH as equal to the weighting coefficient $\beta_{pr}$ of the priority channel and the weighting coefficient $\beta_d$ of the DPDCH as equal to the weighting coefficient $\beta_{npr}$ of the non-priority channel and proceeds to step S3.

In step S3, the transmission-power controller 17 finds the values of $K_c$ and $K_{hs}$ by using the arithmetic expressions shown at step S3 so as to make $P_{bb}$ constant regardless of any values of $\beta_d$, $\beta_c$, and $\beta_{hs}$. In this embodiment, the transmission-power controller 17 finds, in step S3, only the amplitude ratio-setting coefficient $K_c$ of the DPCCH and the amplitude ratio-setting coefficient $K_{pr}$ of the channel designated as the priority one in step 20. Then, the transmission-power controller 17 proceeds to step S4.

In step S4, the transmission-power controller 17 checks to see whether the transmission in process is the initial transmission or not. If it is the initial transmission, the transmission-power controller 17 proceeds to step S5. If it is not, the transmission-power controller 17 proceeds to step S6.

In step S5, the transmission-power controller 17 subtracts $P_{bb}$ from $P_{ini}$ to find G and proceeds to step S7.

On the other hand, in step S6, the transmission-power controller 17 calculates the gain G to be given to the variable-gain amplifier 6 from the transmission power at the time of previous power control $G_{prev}$, the present amplitude ratio-setting coefficient $K_c$, the amplitude ratio-setting coefficient used for gain-setting at the time of previous power control $K_{c\_prev}$, and the above TPC_CMD and $\Delta_{TPC}$. The first term of the arithmetic expression shown at step S6 is the set value of the gain at the time of previous power control. The second term of the arithmetic expression is to offset the gain due to the change of $K_c$ occurring as the β's change. The third term of the arithmetic expression is to up and down the gain according to the results of reception of TPC_CMD's. In other words, assuming that the transmission-power controller 17 controls the transmission power as the base station demands, without the restriction of the maximum transmission power $P_{max}$, the transmission-power controller 17 finds the gain G. The gain G is to indicate to what degree the power distribution to the priority channel should be increased if the transmission power exceeds the maximum transmission power $P_{max}$. After the processing of step S6, the transmission-power controller 17 proceeds to step S7.

In step S7, the transmission-power controller 17 stores the value of $K_c$ found in step S3 as the amplitude ratio-setting coefficient $K_{c\_prev}$ to be used for gain-setting at the time of next power control.

In step S8, the transmission-power controller 17 stores the gain G found in step S5 or S6, as the case may be, as a gain $G_{prev}$ to be used for the next power control and proceeds to step S9.

In step S9, the transmission-power controller 17 subtracts $P_{bb}$ from $P_{max}$ and checks to see whether G is larger than the remainder or not. In other words, the transmission-power controller 17 checks to see whether the gain G causes the transmission power to exceed the maximum transmission power $P_{max}$ or not. If the transmission power exceeds the maximum transmission power $P_{max}$, the transmission-power controller 17 proceeds to step S10. If not, the transmission-power controller 17 proceeds to step S15.

If the transmission-power controller 17 has proceeded to step S10, it gives the gain equal to the excess of the transmission power over the maximum transmission power $P_{max}$ to the variable-gain amplifier 6. Thus, signals of the priority channel are transmitted at the power level demanded by the base station.

In this case, however, it is indispensable that the transmission power of the non-priority channel is sufficient; accordingly, the transmission-power controller 17 checks the transmission power in step S11 by using the arithmetic expression shown at step S11. If the transmission power of the non-priority channel is not sufficient, the transmission-power controller 17 proceeds to step S12. If the transmission power of the non-priority channel is sufficient, the transmission-power controller 17 proceeds to step S14.

In step S12, the transmission-power controller 17 sets the power distribution to the non-priority channel at a preset minimum value, and the remaining power is distributed to the DPCCH and the priority channel.

In step S13, the transmission-power controller 17 changes the gain $G_{prev}$ to be use at the time of the next power control to the extent corresponding to the extent of the change of $K_c$ in step S12.

In step S24, the transmission-power controller 17 regards $K_c$, found in step S12 as $K_c$ and proceeds to step S14.

In step S14, the transmission-power controller 17 sets a limit on the gain G. Namely, as the gain G of the variable-gain amplifier 6 cannot be set so high as to cause the transmission power to exceed the maximum transmission power $P_{max}$, the gain G is limited in step S14.

In step S15, the transmission-power controller 17 finds the value of the amplitude ratio-setting coefficient $K_{npr}$ of the non-priority channel which renders the sum of power of the channels equal to $P_{bb}$ on the input side of the variable-gain amplifier 6.

In step S25, the transmission-power controller 17 checks the priority-channel information $CH_{sel}$ to find which is the priority channel, the DPDCH or the HS-DPCCH. If the DPDCH is the priority one, the transmission-power controller 17 proceeds to step S26. If the HS-DPCCH is the priority one, the transmission-power controller 17 proceeds to step 27.

In step S26, the transmission-power controller 17 regards the $K_d$ of the DPDCH as equal to $K_{pr}$ of the priority channel and the $K_{hs}$ of the HS-DPCCH as equal to $K_{npr}$ of the non-priority channel and returns to step S2.

If the transmission-power controller 17 has proceeded to step 27, it regards the $K_{hs}$ of the HS-DPCCH as equal to $K_{pr}$ of the priority channel and the $K_d$ of the DPDCH as equal to $K_{npr}$ of the non-priority channel and returns to step S2.

Choice of Priority Channel in First Embodiment

Next, materials based on which the priority-channel selector 18 chooses either the DPDCH or the HS-DPCCH as a priority channel will be described below.

The priority-channel selector 18 of the portable telephone terminal according to the first embodiment chooses either the DPDCH or the HS-DPCCH as a priority channel based on the first to fourth materials to be described below. Any number of each of the first to fourth materials may be used, or any two or more materials may be combined.

The signal types (ACK, NACK, CQI, and DTX) of the HS-DPCCH are the first material. The data-transmission rate of the HS-DSCH corresponding to ACK of the HS-DPCCH is the second material. The time intervals of CQI transmission are the third material. The power-distribution ratio among the channels is the fourth material.

Each material will be described below.

First of all, the priority-channel selector 18 uses the signal types of ACK, NACK, CQI, or DTX of the HS-DPCCH as the first material and chooses a priority channel based on the first material. If the type of signals being transmitted through the HS-DPCCH is NACK, the priority-channel selector 18 chooses the DPDCH as a priority channel. If NACK is being transmitted through the HS-DPCCH and the signals of the portable telephone terminal do not reach the base station due to insufficient transmission power, the relevant signals of the DPDCH are retransmitted from the base station to the portable telephone terminal; accordingly, if NACK is sent to the base station, the priority-channel selector 18 chooses the DPDCH as a priority channel.

If ACK is being sent through the HS-DPCCH and the data-transmission rate of the HS-DSCH corresponding to the HS-DPCCH is higher than a prescribed threshold value, the priority-channel selector 18 chooses the HS-DPCCH as a priority channel. Namely, if the base station cannot receive ACK, the base station resends the relevant data to the portable telephone terminal, and if the data-transmission rate is high, the effects of the retransmission are significant, reducing the average data-transmission rate of the HSDPA service; accordingly, the priority-channel selector 18 chooses the HS-DPCCH as a priority channel if the data-transmission rate of the HS-DSCH is higher than a prescribed threshold value.

The priority-channel selector 18 uses the time intervals of CQI transmission through the HS-DPCCH as the third material and chooses the HS-DPCCH as a priority channel if the time intervals are longer than prescribed time intervals. The CQI is information about the quality of reception of the portable telephone terminal. The portable telephone terminal sends out CQI's to the base station at time intervals designated by the base station. The base station estimates the quality of reception based on the control information of the DPCCH while no CQI is being sent out. Accordingly, if the time intervals of CQI transmission and, hence, the periods of the base station's non-reception of CQI's become longer, the error in estimation of reception quality made by the base station based on the control information of the DPCCH becomes larger. As a result, the average data-transmission rate of the HSDPA service may be decreased. On the other hand, if the time intervals of CQI transmission becomes longer, the periods of non-transmission of CQI's become longer; accordingly, if the transmission power of the DPDCH is lowered while CQI's are being transmitted, its effects would be small. Therefore, the priority-channel selector 18 chooses the HS-DPCCH as a priority channel if the time intervals of CQI transmission of the HS-DPCCH are long.

The priority-channel selector 18 uses the power-distribution ratio among the channels as the fourth material and chooses a channel with relatively small distribution of power as a priority channel. Namely, even if the transmission power of a channel with relatively small distribution of power is raised as demanded by the base station, the reduction of transmission power of the non-priority channel with a relatively large distribution of power would be small. Therefore, the priority-channel selector 18 chooses a channel with relatively small distribution of power as a priority channel.

Flow of Processing for Choice of Priority Channel of First Embodiment

Figure 3:
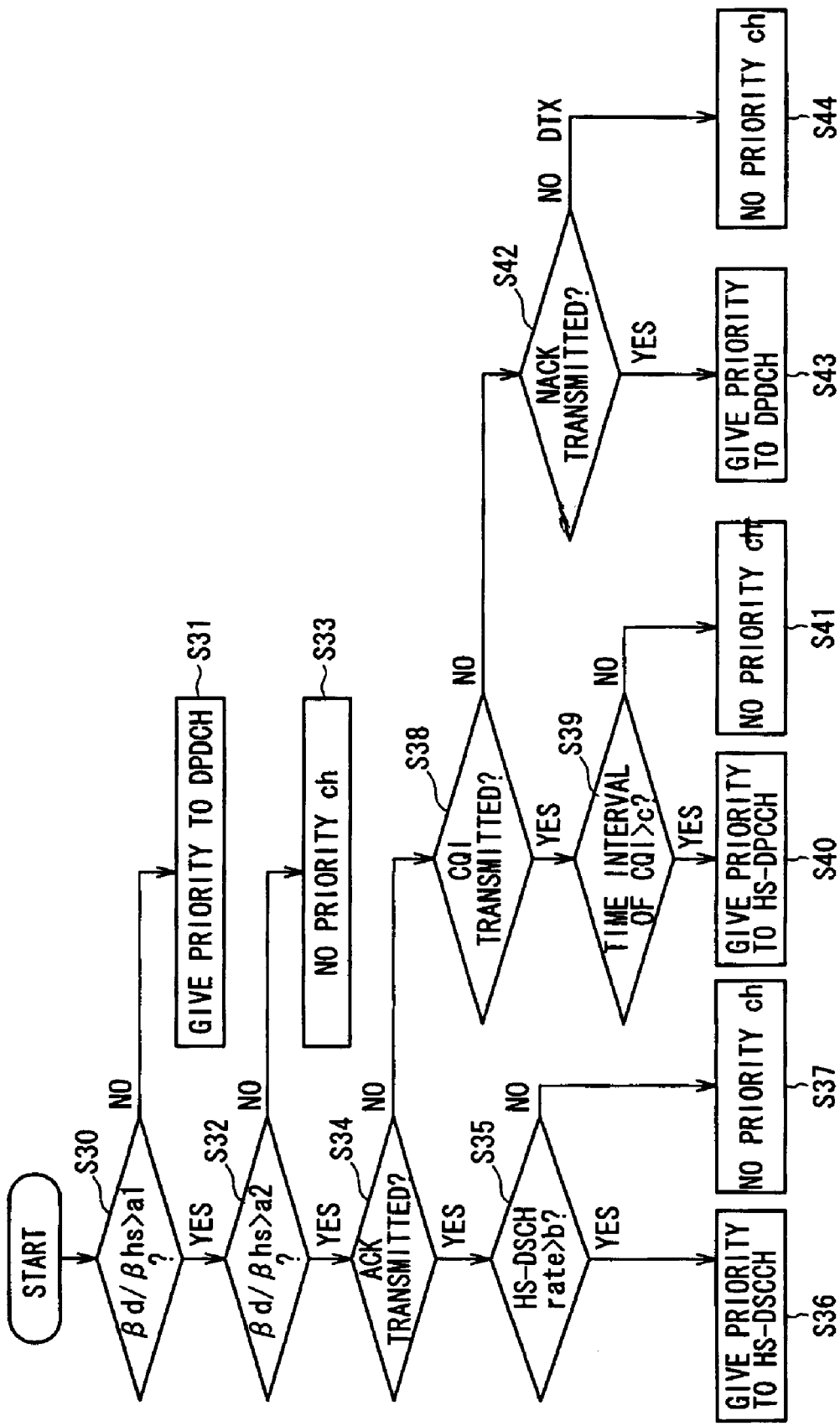
FIG. 3 is a flowchart showing processing for choice of a priority channel by the priority-channel selector of the first embodiment of the present invention.

Next, the processing for choice of a priority channel will be described by referring to the flowchart of FIG. 3. The first to fourth materials are combined in the processing.

In step S30, the priority-channel selector 18 compares $\beta_d$ and $\beta_{hs}$ with the threshold value $a_1$. If $\beta_d/\beta_{hs}$ is equal to or smaller than $a_1$, the priority-channel selector 18 proceeds to step S31 to choose the DPDCH as a priority channel. If $\beta_d/\beta_{hs}$ is larger than $a_1$, the priority-channel selector 18 proceeds to step S32.

In step S32, the priority-channel selector 18 compares $\beta_d$ and $\beta_{hs}$ with the threshold value $a_2$. If $\beta_d/\beta_{hs}$ is equal to or smaller than $a_2$, that is to say, $\beta_d/\beta_{hs}$ is larger than $a_1$ and equal to or smaller than $a_2$, the priority-channel selector 18 proceeds to step 33 to choose no priority channel. If $\beta_d/\beta_{hs}$ is larger than $a_2$, the priority-channel selector 18 proceeds to step 34.

In step S34, the priority-channel selector 18 checks to see if ACK is being transmitted through the HS-DPCCH. If ACK is being transmitted through the HS-DPCCH, the priority-channel selector 18 proceeds to step S35. If not, the priority-channel selector 18 proceeds to step 38.

In step 35, the priority-channel selector 18 compares the data rate of the HS-DSCH and its threshold value b. If the data rate of the HS-DSCH is larger than its threshold value b, the priority-channel selector 18 proceeds to step S36 to choose the HS-DPCCH as a priority channel.

On the other hand, if the priority-channel selector 18 has found that the data rate of the HS-DSCH is equal to or smaller than its threshold value b, the priority-channel selector 18 proceeds to step S37 to choose no priority channel.

If the priority-channel selector 18 has proceeded from step S34 to step S38, the priority-channel selector 18 checks if CQI's are transmitted through the HS-DPCCH. If CQI's are transmitted through the HS-DPCCH, the priority-channel selector 18 proceeds to step S39. If not, the priority-channel selector 18 proceeds to step S42.

In step S39, the priority-channel selector 18 compares the time intervals of CQI's with their threshold value c. If the time intervals of CQI's are longer than their threshold value c, the priority-channel selector 18 proceeds to step S40 to choose the HS-DPCCH as a priority channel.

On the other hand, if the time intervals of CQI's are equal to or shorter than their threshold value c, the priority-channel selector 18 proceeds to step S41 to choose no priority channel.

If the priority-channel selector 18 has proceeded from step S38 to step S42, the priority-channel selector 18 checks to see if NACK is being transmitted through the HS-DPCCH. If NACK is being transmitted through the HS-DPCCH, the priority-channel selector 18 proceeds to step S43. If not, the priority-channel selector 18 proceeds to step S44.

In step S43, the priority-channel selector 18 chooses the DPDCH as a priority channel.

If the priority-channel selector 18 has proceeded to step S44, it chooses no priority channel.

Summary of First Embodiment

As described above, according to the first embodiment of the present invention, if the transmission power demanded by the base station exceeds the maximum transmission power $P_{max}$ of the portable telephone terminal, the priority-channel selector 18 determines the order of priority of the DPDCH, DPCCH, and HS-DPCCH and the transmission-power controller 17 changes the power-distribution ratio among them according to their order of priority. Namely, the priority-channel selector 18 and the transmission-power controller 17 control the transmission power of the priority channel as demanded by the base station on the one hand and control the transmission power of the non-priority channel so that the total transmission power of the channels does not exceed the maximum transmission power on the other hand. Thus, signals can be transmitted without deteriorating the characteristics of the priority channel at the base station on the receiving side.

Besides, according to the first embodiment of the present invention, if the HS-DPCCH is a priority channel and ACK is being transmitted through the HS-DPCCH, unnecessary retransmission from the base station can be avoided. If the HS-DPCCH is a priority channel and CQI's are being transmitted through the HS-DPCCH, accurate information about the quality or reception can be transmitted to the base station; accordingly, decrease of the downlink high-speed data-transmission rate of HSDPA service is avoided.

Construction of Portable Telephone Terminal of Second Embodiment

FIG. 4 shows an example of the construction of the portable telephone terminal according to the second embodiment of the present invention. In FIG. 4, only the main components are shown, the other ones such as filters omitted. Components in FIG. 4, which are the same as components in FIG. 1, have the same reference numerals as the same components in FIG. 1 have, and the description of the same components in FIG. 4 is omitted.

In the same way as the CPU/DSP 16 of FIG. 1, the CPU/DSP 36 of FIG. 4 includes an RLC for retransmission and correction. If the decoded data from the HS-DSCH decoder 12 can be retransmitted and corrected in the RLC, the retransmission/correction processing is made in the RLC. Besides, the CPU/DSP 36 has a function of finding the used capacities of the transmission and reception buffers from the remaining capacity of the memory 40 and holds prescribed threshold values A and B to be described later in an internal memory or the like. Moreover, the CPU/DSP 36 of the second embodiment has a function of sending the priority-channel selector 38 information about (i) a flag indicating whether the data of the DPDCH can be retransmitted and corrected or not (hereinafter "DPDCH-retransmission flag), (ii) a flag indicating whether the data of the HS-DSCH can be retransmitted and corrected in the RLC layer (hereinafter "HS-DSCH/RLC-retransmission flag), (iii) the used capacity of the transmission buffer to realize the retransmission and correction of data of the DPDCH in the RLC layer, (iv) the used capacity of the reception buffer to realize the retransmission and correction of data of the HS-DSCH in the RLC layer, and (v) the prescribed threshold values A and B.

Although details will be described later, the priority-channel selector 38 chooses a priority channel based on various pieces of information from the CPU/DSP 36.

Choice of Priority Channel in Second Embodiment

Next, materials based on which the priority-channel selector 38 chooses either the DPDCH or the HS-DPCCH as a priority channel will be described below.

The priority-channel selector 38 of the portable telephone terminal according to the second embodiment chooses either the DPDCH or the HS-DPCCH as a priority channel based on the fifth and sixth materials to be described below. They may be used separately or combined and used.

In the second embodiment, the priority-channel selector 38 uses, as the fifth material, information about whether the data allocated to the DPDCH can be retransmitted in the RLC or not and whether the transmission buffer has unused capacity necessary for the retransmission or not if the data can be retransmitted in the RLC. To be specific, the priority-channel selector 38 uses the above DPDCH-retransmission flag, used capacity of the transmission buffer, and prescribed threshold value A all coming from the CPU/DSP 36. First, the priority-channel selector 38 checks the DPDCH-retransmission flag to see whether the data of the DPDCH can be retransmitted and corrected or not. If they can, the priority-channel selector 38 checks the used capacity of the transmission buffer and the prescribed threshold value A to see whether the transmission buffer has sufficient unused capacity or not. If the data allocated to the DPDCH cannot be retransmitted in the RLC or the transmission buffer does not have sufficient unused capacity, the priority-channel selector 38 chooses the DPDCH as a priority channel.

Besides, the priority-channel selector 38 uses, as the sixth material, information about whether the data allocated to the HS-DSCH can be retransmitted in the RLC or not and whether the reception buffer has unused capacity necessary for the retransmission or not if the data can be retransmitted in the RLC. To be specific, the priority-channel selector 38 uses the above HS-DSCH/RLC-retransmission flag, used capacity of the reception buffer, and prescribed threshold value B all coming from the CPU/DSP 36. First, the priority-channel selector 38 checks the HS-DSCH/RLC-retransmission flag to see whether the data of the HS-DSCH can be retransmitted and corrected in the RLC layer or not. If they can, the priority-channel selector 38 checks the used capacity of the reception buffer and the prescribed threshold value B to see whether the reception buffer has sufficient unused capacity or not. If the data allocated to the HS-DSCH cannot be retransmitted in the RLC or the reception buffer does not have sufficient unused capacity, the priority-channel selector 38 chooses the HS-DPCCH as a priority channel.

Flow of Processing for Choice of Priority Channel of Second Embodiment

Next, the processing for choice of a priority channel will be described by referring to the flowchart of FIG. 5. The fifth and sixth materials are combined in the processing.

Figure 5:
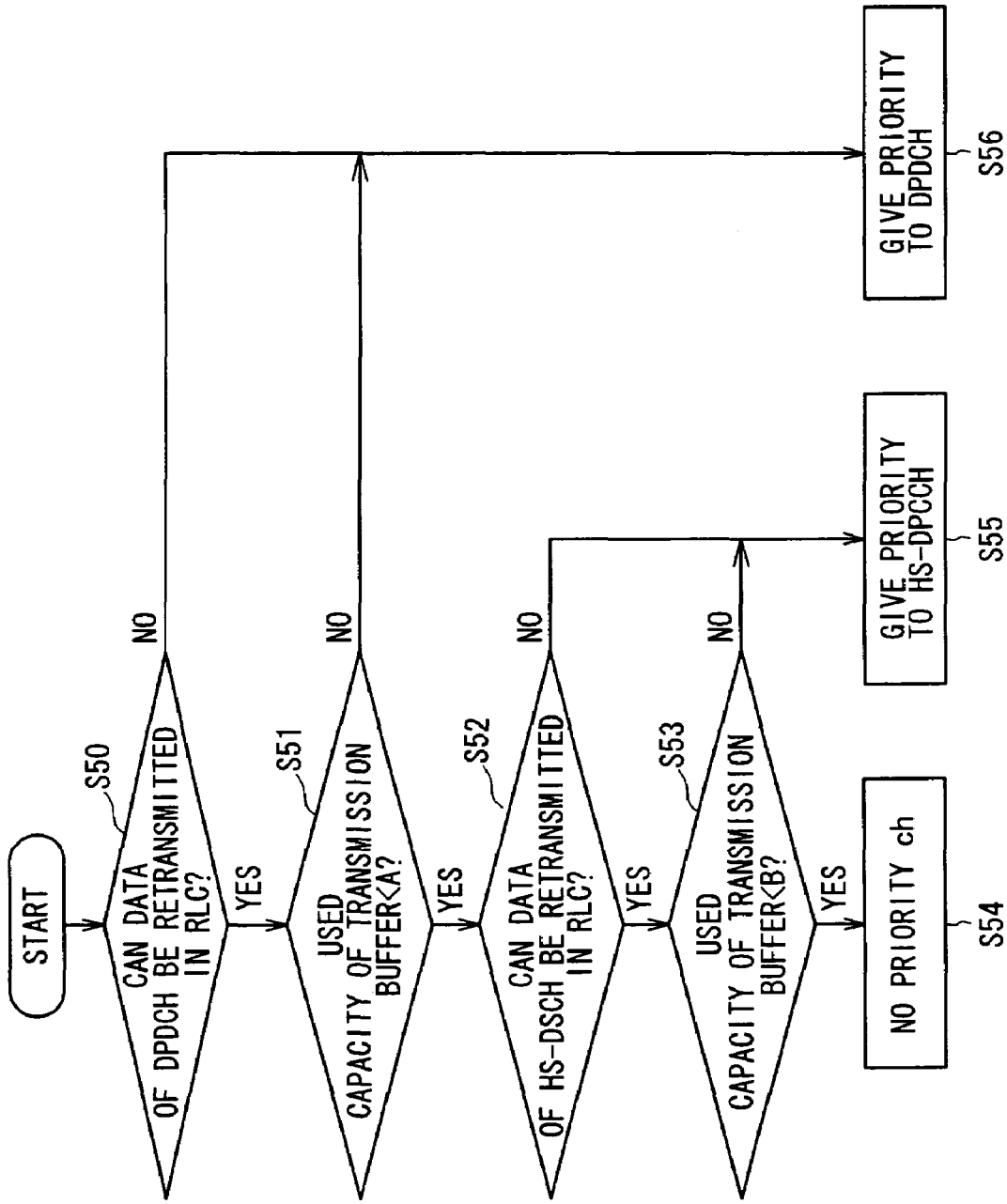
FIG. 5 is a flowchart showing processing for choice of a priority channel by the priority-channel selector of the second embodiment of the present invention.

In step S50 of FIG. 5, the priority-channel selector 38 checks the DPDCH-retransmission flag sent from the CPU/DSP 36 to see whether the data allocated to the DPDCH can be retransmitted in the RLC or not. If the data is found in step S50 that it cannot be retransmitted, the priority-channel selector 38 proceeds to step S56 and chooses the DPDCH as a priority channel. Namely, the priority-channel selector 38 finds that the data allocated to the DPDCH cannot be retransmitted or corrected and chooses the DPDCH as a priority channel. If the priority-channel selector 38 has found in step S50 that the data can be transmitted, it proceeds to step S51.

In step S51, the priority-channel selector 38 checks the used capacity of the transmission buffer and the threshold value A to ascertain the used capacity of the transmission buffer and whether the used capacity is smaller than the threshold value A or not. To be specific, the prescribed threshold value A is 90% of total capacity of the transmission buffer. If the used capacity is not smaller than the threshold value A in step 51, the priority-channel selector 38 proceeds to step S56 and chooses the DPDCH as a priority channel. Namely, the priority-channel selector 38 finds that the retransmission and correction of the data of the DPDCH are difficult and chooses the DPDCH as a priority channel. On the other hand, if the priority-channel selector 38 has found in step S51 that the used capacity of the transmission buffer is smaller than the threshold value A, it proceeds to step S52.

In step S52, the priority-channel selector 38 checks the HS-DSCH/RLC-retransmission flag to see whether the data allocated to the HS-DSCH can be retransmitted in the RLC or not. If the data cannot be retransmitted in step S52, the priority-channel selector 38 proceeds to step S55 and chooses the HS-DPCCH as a priority channel. Namely, the priority-channel selector 38 finds that the data allocated to the HS-DSCH cannot be retransmitted or corrected in the RLC and chooses the HS-DPCCH as a priority channel. If the priority-channel selector 38 has found in step S52 that the data can be transmitted, it proceeds to step S53.

In step S53, the priority-channel selector 38 checks the used capacity of the reception buffer and the threshold value B to ascertain the used capacity of the reception buffer and whether the used capacity is smaller than the threshold value B or not. To be specific, the prescribed threshold value B is 90% of total capacity of the reception buffer. If the used capacity is not smaller than the threshold value B, the priority-channel selector 38 proceeds to step S55 and chooses the HS-DPCCH as a priority channel. Namely, the priority-channel selector 38 finds that the retransmission and correction of the data of the HS-DSCH are difficult and chooses the HS-DPCCH as a priority channel. On the other hand, if the priority-channel selector 38 has found in step S53 that the used capacity of the reception buffer is smaller than the threshold value B, it proceeds to step S54.

In step S54, the priority-channel selector 38 chooses no channel as a priority channel because the data of both the DPDCH and the HS-DSCH can be retransmitted and corrected.

The workings of the portable telephone terminal of FIG. 4 after priority-channel selector 38 chooses a priority channel are the same as the workings of the portable telephone terminal of FIG. 1 after priority-channel selector 38 chooses a priority channel.

Summary of Second Embodiment

As described above, according to the second embodiment of the present invention, if the transmission power demanded by the base station exceeds the maximum transmission power $P_{max}$ of the portable telephone terminal, the priority-channel selector 38 determines the order of priority of the DPDCH and HS-DPCCH and the transmission-power controller 17 changes the power-distribution ratio between them according to their order of priority. Namely, the priority-channel selector 38 and the transmission-power controller 17 control the transmission power of the priority channel as demanded by the base station on the one hand and control the transmission power of the non-priority channel so that the total transmission power of the channels does not exceed the maximum transmission power on the other hand. Thus, signals can be transmitted without deteriorating the characteristics of the priority channel at the base station on the receiving side.

In the case of the second embodiment in particular, the priority-channel selector 38 checks to see whether the data of the channels can be retransmitted or not and chooses, as a priority channel, a channel whose data are more difficult to retransmit or a channel relating to the difficult channel. Thus, the probability of success in data retransmission is high.

Namely, in the second embodiment, if the DPDCH is chosen as a priority channel and the transmission power exceeds the prescribed maximum transmission power $P_{max}$, transmission power can be distributed to the DPDCH as demanded by the base station; therefore signals can be transmitted without deteriorating the reception characteristics at the communication device at the other end. Particularly, in the second embodiment, it is when retransmission and correction of the DPDCH data is impossible or difficult that the DPDCH is chosen as a priority channel. Thus, according to the present embodiment, the probability of success in data retransmission of the DPDCH is higher than the conventional system.

Further, in the second embodiment of the present invention, if the HS-DPCCH is chosen as a priority channel and the transmission power exceeds the maximum transmission power $P_{max}$, transmission power can be distributed to the HS-DPCCH as demanded by the base station; therefore signals can be transmitted without deteriorating the reception characteristics at the communication device at the other end. Thus, the probability of success in transmitting ACK and CQI of the HS-DPCCH correctly is high. Namely, when the ACK is transmitted correctly, unnecessary HS-DSCH data are no longer retransmitted, and necessary HS-DSCH data can be transmitted. Therefore, transmission characteristics of the HS-DSCH can be improved. Further, when the CQI can be correctly transmitted, the HS-DSCH data are transmitted with the appropriate modulation factor/encoding rate. As a result, the probability of receiving the HS-DSCH data normally is high. Particularly, in the present embodiment, it is when retransmission and correction of the HS-DSCH data in the RLC is impossible or difficult that the HS-DPCCH is chosen as a priority channel. Thus, according to the present embodiment, the probability of success in data transmission of the HS-DSCH is higher than the conventional system.

Although the invention has been described in its preferred form with a certain degree of particularity, it is understood that the present disclosure of the preferred form maybe changed in the details of construction and the combination and arrangement of parts may be resorted to without departing from the spirit and the scope of the invention. For example, the present invention can be applied not only to portable telephone terminals but also to other mobile communication terminals. Further, the present invention is applicable not only to the HSDPA service of W-CDMA but also to other communication systems. Also, in the above embodiments, the priority-channel selector chooses a priority channel from two channels, namely, the DPDCH and HS-DPCCH. In the present invention, however, the priority-channel selector may choose a priority channel from among three or more channels.

The foregoing invention has been described in terms of preferred embodiments. However, those skilled in the art will recognize that many variations of such embodiments exist. Such variations are intended to be within the scope of the present invention and the appended claims.

What is claimed is:

1. A mobile communication terminal comprising:
   a signal-sending/receiving unit capable of sending and receiving multiplexed signals through a plurality of channels,
   a transmission-power adjuster to adjust transmission power of the individual channels,
   a transmission-power controller to control a power-distribution ratio for adjustment of transmission power of the individual channels by said transmission-power adjuster,
   an information holder holding the maximum transmission power of the mobile communication terminal, and
   a priority-setting unit to set order of priority of the individual channels by using prescribed materials for determining the order of priority;
   wherein said transmission-power controller compares the transmission power demanded by a communication terminal at the other end through said signal-sending/receiving unit and the maximum transmission power held by said information holder and controls the transmission power of individual channels according to the transmission power demanded by the communication device at the other end, and
   wherein, if the total transmission power of the individual channels is going to exceed the maximum transmission power, said transmission-power controller determines the power-distribution ratio among the channels so that transmission power of a channel given priority by said priority-setting unit is adjusted to a power level demanded by the communication device at the other end on the one hand and transmission power of a channel or channels not given priority by said priority-setting unit is adjusted so as to confine total transmission power to the maximum transmission power on the other hand.

2. A mobile communication terminal as set forth in claim 1;
   wherein the plurality of channels through which multiplexed signals are sent and received includes at least
   a data-transmitting channel,
   a control information-transmitting channel for transmission of control information corresponding to said data-transmitting channel, and
   a channel being different from said data-transmitting channel for transmitting high-speed control information corresponding to a high-speed data-transmitting channel, all prescribed in a prescribed communication standard, and
   wherein said priority-setting unit puts aside said channel for transmitting high-speed control information as a priority channel, and determines order of priority of said data-transmitting channel and said high-speed-control-information-transmitting channel.

3. A mobile communication terminal as set forth in claim 2,
   wherein said priority-setting unit uses, as the materials for setting the order of priority of channels, information about whether or not said data-transmitting channel and said high-speed-control-information-transmitting channel are used, whether or not data transmitted through the high-speed-control-information-transmitting channel is the retransmission-control information to the communication device at the other end when said data-transmitting channel and said high-speed-control-information-transmitting channel are used, and whether or not information on the quality of reception is transmitted through said high-speed-control-information-transmitting channel to the communication device at the other end when said data-transmitting channel and said high-speed-control-information-transmitting channel are used,
   wherein, while said data-transmitting channel and said high-speed-control-information-transmitting channel are being used, said priority-setting unit gives priority to said data-transmitting channel if retransmission is demanded by retransmission-control information of said high-speed-control-information-transmitting channel, wherein, while said data-transmitting channel and said high-speed-control-information-transmitting channel are being used, said priority-setting unit gives priority to said high-speed-control-information-transmitting channel if retransmission is not demanded by retransmission-control information of said high-speed-control-information transmitting channel, and wherein, while said data-transmitting channel and said high-speed-control-information-transmitting channel are being used, said priority-setting unit gives priority to said high-speed-control-information-transmitting channel if the information on the quality of reception is transmitted to the communication device at the other end through said high-speed-control-information-transmitting channel.

4. A mobile communication terminal as set forth in claim 2, wherein said priority-setting unit uses, as the materials for setting the order of priority of channels, information about whether or not said data-transmitting channel and said high-speed-control-information-transmitting channel are used, whether or not the information transmitted through the high-speed-control-information-transmitting channel is the retransmission-control information to the communication device at the other end when said data-transmitting channel and said high-speed-control-information-transmitting channel are used, and the data-transmission rate of said high-speed data-transmitting channel when retransmission is not demanded by the retransmission-control information of said high-speed-control-information-transmitting channel, and wherein, while said data-transmitting channel and said high-speed-control-information-transmitting channel are being used, said priority-setting unit gives priority to said high-speed-control-information-transmitting channel if retransmission is not demanded by retransmission-control information of said high-speed-control-information-transmitting channel and the data-transmission rate of said high-speed data-transmitting channel is higher than a prescribed threshold value.

5. A mobile communication terminal as set forth in claim 3, wherein said priority-setting unit uses also the data-transmission rate of said high-speed data-transmitting channel as the prescribed material for setting the order of priority of channels when retransmission is not demanded by the retransmission-control information of said high-speed-control-information-transmitting channel, and wherein, while said data-transmitting channel and said high-speed-control-information-transmitting channel are being used, said priority-setting unit gives priority to said high-speed-control-information-transmitting channel if retransmission is not demanded by the retransmission-control information of said high-speed-control-information-transmitting channel and the data-transmission rate of said high-speed data-transmitting channel is higher than a prescribed threshold value.

6. A mobile communication terminal as set forth in claim 2, wherein said priority-setting unit uses, as the materials for setting the order of priority of channels, information about whether or not said data-transmitting channels and said high-speed-control-information-transmitting channel are used, whether or not information on the quality of reception is transmitted through said high-speed-control-information-transmitting channel to the communication device at the other end when said data-transmitting channel and said high-speed-control-information-transmitting channel are used, and time intervals of transmission of the information on the quality of reception signals when the information on the quality of reception is transmitted through said high-speed-control-information-transmitting channel to the communication device at the other end, and wherein, while said data-transmitting channel and said high-speed-control-information-transmitting channel are being used, said priority-setting unit gives priority to said high-speed-control-information-transmitting channel if the information on the quality of reception is transmitted through said high-speed-control-information-transmitting channel to the communication device at the other end and the time intervals of transmission of the information is longer than a prescribed threshold value.

7. A mobile communication terminal as set forth in claim 3, wherein said priority-setting unit uses also the time intervals of transmission of the information on the quality of reception as the material for setting the order of priority of channels when the information on the quality of reception is transmitted through said high-speed-control-information-transmitting channel to the communication device at the other end, and wherein, while said data-transmitting channel and said high-speed-control-information-transmitting channel are being used, said priority-setting unit gives priority to said high-speed-control-information-transmitting channel if the information on the quality of reception is transmitted through said high-speed-control-information-transmitting channel to the communication device at the other end and the time intervals of transmission of the information is longer than a prescribed threshold value.

8. A mobile communication terminal as set forth in claim 2, wherein said priority-setting unit uses the power-distribution ratio among the channels as the prescribed material for setting the order of priority of channels and gives priority to said data-transmitting channel if the power-distribution ratio of said data-transmitting channel to said high-speed-control-information-transmitting channel is equal to or smaller than a prescribed threshold value and gives priority to said high-speed-control-information-transmitting channel if the power-distribution ratio of said data-transmitting channel to said high-speed-control-information-transmitting channel is larger than the prescribed threshold value.

9. A mobile communication terminal as set forth in claim 1; wherein the plurality of channels through which multiplexed signals are sent and received includes at least a data-transmitting channel, a control information-transmitting channel for transmission of control information corresponding to said data-transmitting channel, and a channel being different from said data-transmitting channel for transmitting high-speed control information corresponding to a high-speed data-transmitting channel, all prescribed in a prescribed communication standard, wherein said priority-setting unit uses, as the prescribed materials for setting the order of priority of channels, information about whether data to be transmitted through said data-transmitting channel can be retransmitted or not and whether a buffer for storage of the data to be retransmitted has sufficient unused capacity or not if the data can be retransmitted, and wherein said priority-setting unit gives priority to said data-transmitting channel if the data to be transmitted through said data-transmitting channel cannot be retransmitted or the buffer does not have sufficient unused capacity.

10. A mobile communication terminal as set forth in claim 1;
wherein the plurality of channels through which multiplexed signals are sent and received includes at least
a data-transmitting channel,
a control information-transmitting channel for transmission of control information corresponding to said data-transmitting channel, and
a channel being different from said data-transmitting channel for transmitting high-speed control information corresponding to a high-speed data-transmitting channel, all prescribed in a prescribed communication standard,
wherein said priority-setting unit uses, as the prescribed materials for setting the order of priority of channels, information about whether data to be transmitted through said high-speed data-transmitting channel can be retransmitted or not and whether a buffer for storage of the data to be retransmitted has sufficient unused capacity or not if the data can be retransmitted, and
wherein said priority-setting unit gives priority to said high-speed-control-information-transmitting channel if the data to be transmitted through said high-speed data-transmitting channel cannot be retransmitted or the buffer does not have sufficient unused capacity.

11. A mobile communication terminal as set forth in claim 1;
wherein the plurality of channels through which multiplexed signals are sent and received includes at least
a data-transmitting channel,
a control information-transmitting channel for transmission of control information corresponding to said data-transmitting channel, and
a channel being different from said data-transmitting channel for transmitting high-speed control information corresponding to a high-speed data-transmitting channel, all prescribed in a prescribed communication standard,
wherein said priority-setting unit uses, as the prescribed materials for setting the order of priority of channels, information about whether data to be transmitted through said data-transmitting channel can be retransmitted or not, whether a buffer for storage of the data to be retransmitted through said data-transmitting channel has sufficient unused capacity or not if the data can be retransmitted through said data-transmitting channel, whether data to be transmitted through said high-speed data-transmitting channel can be retransmitted or not if the data to be transmitted through said data-transmitting channel can be retransmitted and the buffer has sufficient unused capacity for storage of the data to be retransmitted through said data-transmitting channel, and whether the buffer for storage of the data to be retransmitted through said high-speed data-transmitting channel has sufficient unused capacity or not if the data can be retransmitted through said high-speed data-transmitting channel,
wherein said priority-setting unit gives priority to said data-transmitting channel if the data cannot be retransmitted through said data-transmitting channel or the buffer does not have sufficient unused capacity for the storage of the data to be retransmitted through said data-transmitting channel, and
wherein said priority-setting unit gives priority to said high-speed-control-information-transmitting channel if the data can be retransmitted through said data-transmitting channel, the buffer has sufficient unused capacity for the storage of the data to be retransmitted through said data-transmitting channel, and the data cannot be retransmitted through said high-speed data-transmitting channel or the buffer does not have sufficient unused capacity for the storage of the data to be retransmitted through said high-speed data-transmitting channel.

12. A method of controlling transmission power comprising the steps of:
sending and receiving multiplexed signals by a signal-sending/receiving unit through a plurality of channels,
adjusting the transmission power of the individual channels by a transmission-power adjuster,
controlling a power-distribution ratio by a transmission-power controller for the adjustment, by said transmission-power adjuster, of the transmission power of the individual channels, and
setting the order of priority of the channels by using prescribed materials for determining the order of priority;
wherein said step of controlling the power-distribution ratio by said transmission-power controller includes the steps of
comparing the transmission power demanded through said signal-sending/receiving unit by the communication device at the other end and information about the maximum transmission power of the mobile communication terminal held by the information holder, and
determining the power-distribution ratio among the individual channels in such a way that the transmission power of the individual channels is controlled according to the transmission power demanded by the communication device at the other end and, if the total transmission power of the channels is going to exceed the maximum transmission power, the transmission power of the channel given priority by said priority-setting unit is adjusted to a power level demanded by the communication device at the other end on the one hand and the transmission power of a channel or channels not given priority by said priority-setting unit is adjusted so as to confine the total transmission power to the maximum transmission power on the other hand.

* * * * *